(12) United States Patent
Yang

(10) Patent No.: US 7,398,104 B2
(45) Date of Patent: Jul. 8, 2008

(54) MOBILE PHONE WITH WIRELESS CAMERA DETECTION

(75) Inventor: Hai-Tao Yang, Sujhou (CN)

(73) Assignee: Qisda Corporation, Taoyuan (TW)

( * ) Notice: Subject to any disclaimer, the term of this patent is extended or adjusted under 35 U.S.C. 154(b) by 450 days.

(21) Appl. No.: 11/131,046

(22) Filed: May 17, 2005

(65) Prior Publication Data

US 2005/0261023 A1 Nov. 24, 2005

(30) Foreign Application Priority Data

May 18, 2004 (TW) ............... 93113927 A

(51) Int. Cl.
*H04M 1/00* (2006.01)

(52) U.S. Cl. .............. 455/552.1; 455/41.2; 455/67.11; 455/550.1; 455/82; 455/84; 455/226.1; 455/226.2; 455/227; 455/456.1; 455/456.6

(58) Field of Classification Search ............ 455/41.1–2, 455/67.11, 7, 550.1, 82–88, 552.1, 553.1, 455/226.1–4, 227–231, 456.1–6, 67.7
See application file for complete search history.

(56) References Cited

U.S. PATENT DOCUMENTS

| | | | |
|---|---|---|---|
| 6,169,733 B1 * | 1/2001 | Lee ........................... 370/342 |
| 6,249,686 B1 * | 6/2001 | Dvorkin et al. .......... 455/552.1 |
| 6,954,446 B2 * | 10/2005 | Kuffner ..................... 370/335 |
| 7,020,444 B2 * | 3/2006 | Shinbo et al. ................. 455/76 |

* cited by examiner

*Primary Examiner*—Tuan A Tran
(74) *Attorney, Agent, or Firm*—Thomas, Kayden, Horstemeyer & Risley

(57) ABSTRACT

A mobile phone with wireless camera detection. A mobile phone converts the frequency band of a received signal to mobile signal frequency band (for example GSM, DSC or PCS) with added mixer, oscillator, and filter. The converted signal is treated as a mobile signal prior to processing in the base band processor. Detected signal strength is checked to determine whether a wireless camera is currently present.

13 Claims, 5 Drawing Sheets

MOBILE PHONE WITH WIRELESS CAMERA DETECTION

BACKGROUND

The present invention relates to a mobile phone, and more specifically, to a mobile phone with wireless camera detection.

Wireless cameras have become popular for monitoring and recording, possibly threatening personal privacy. Signal detectors detect whether a radio transmitter of a wireless/pinhole camera or listening device is currently operating nearby.

Most handheld signal detectors determine the existence of wireless cameras or listening device within 10 meters using radio frequency (RF) bandwidth detection, and then alert the user by Light Emitting Diode (LED) or vibration. The valid detection bandwidth of the signal detectors is normally 100-900/1100/1200/1300/1400 MHz, very close to the harmonics of signals generated from mobile phones. Thus signal detectors cannot be used when a mobile phone or other radio transmitter is in operation.

SUMMARY

The transmission bandwidth of wireless cameras is typically 1.2 GHz or 2.4 GHz, which is close to the transmission bandwidth for mobile communications. Mobile phones measure signal strength periodically for cell selection and reselection, whereby wireless camera detection using the main configuration of a mobile phone is enabled.

An embodiment provides a mobile phone with wireless camera detection, comprising an antenna, a Surface Acoustic Wave (SAW) filter with a bandwidth corresponding to wireless camera transmission bandwidth (for example, 2.4~2.49 GHz), a Radio Frequency Voltage Control Oscillator (RFVCO), a mixer, and a signal processor. The signal processor can be the original element of a mobile phone. The SAW filter filters the received signal and passes only the frequency band corresponding to the transmission bandwidth of the wireless cameras. The filtered signal is then provided to the mixer. The mixer down converts the filtered signal to the bandwidth corresponding to first mobile phone bandwidth according to the frequency generated by the RFVCO. The down-converted signal is provided to the signal processor to examine and respond the signal strength of the detected signal.

The mobile phone receives dual-bands or multi-bands, and can thus receive the radio signal from wireless cameras as a mobile signal operating in one of the bands after frequency conversion by the mixer. The mobile phone can still function using the remaining of the transmission bandwidth. Another embodiment provides a mobile phone with wireless camera detection which disables communications for the mobile phone when detecting a wireless camera via a switch or software. Detection is only enabled when the mobile phone is switched to a detection mode.

The signal processor of the mobile phone further comprises a low noise amplifier, a modulator, an analog to digital converter (ADC), and a baseband processor, amplifying the signal, converting the signal to baseband, and converting the signal to digital. The baseband processor reports the signal strength and skips the decoding procedure after acquiring the signal strength when processing the radio signal generated from wireless camera. The signal processor scans specific frequencies of the received signal defined by a predetermined frequency band. The predetermined frequency band is typically 200 KHz, corresponding to the signal bandwidth of Global System for Mobile Communications (GSM). The mobile phone analyzes the scanned signal strength to determine whether a wireless camera is present.

Another embodiment provides a dual-band or multi-band mobile phone, with one transmission band dedicated to detection of wireless cameras. For example, a 3-band (900, 1800, 1900 MHz) mobile phone selects an unused frequency band for wireless camera detection, thus leaving the other two frequency bands for mobile communication. The mobile phone requires an additional filter, oscillator, and mixer, to down-convert the 2400 MHz radio signal generated from the wireless camera to the selected frequency band. This is appropriate for countries, like China, do not provide services at 1900 MHz. The mobile phone further comprises a receiving unit, identifying the received signal as either a mobile phone or wireless camera signal according to the current operating mode. The receiving unit can be implemented by an antenna and a switch, which selects a path for the signal received by the antenna according to the status of the switch. The receiving unit can also be implemented using two dedicated antennae, one receiving the bandwidth of mobile phone, the other receiving the bandwidth of wireless camera.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION

The transmission bandwidth of wireless cameras is typically 1.2 GHz or 2.4 GHz, thus the mobile phone disclosed in embodiments of the invention can detect the signal strength of wireless cameras by scanning corresponding bandwidth. The mobile phone disclosed in the embodiments fully utilizes the existing attributes of conventional mobile phones, requiring only an additional filter, mixer, and voltage control oscillator (VCO) in the receiving end to integrate signal detection function. The VCO can also be the existing VCO in the mobile phone.

First Embodiment

Figure 1:
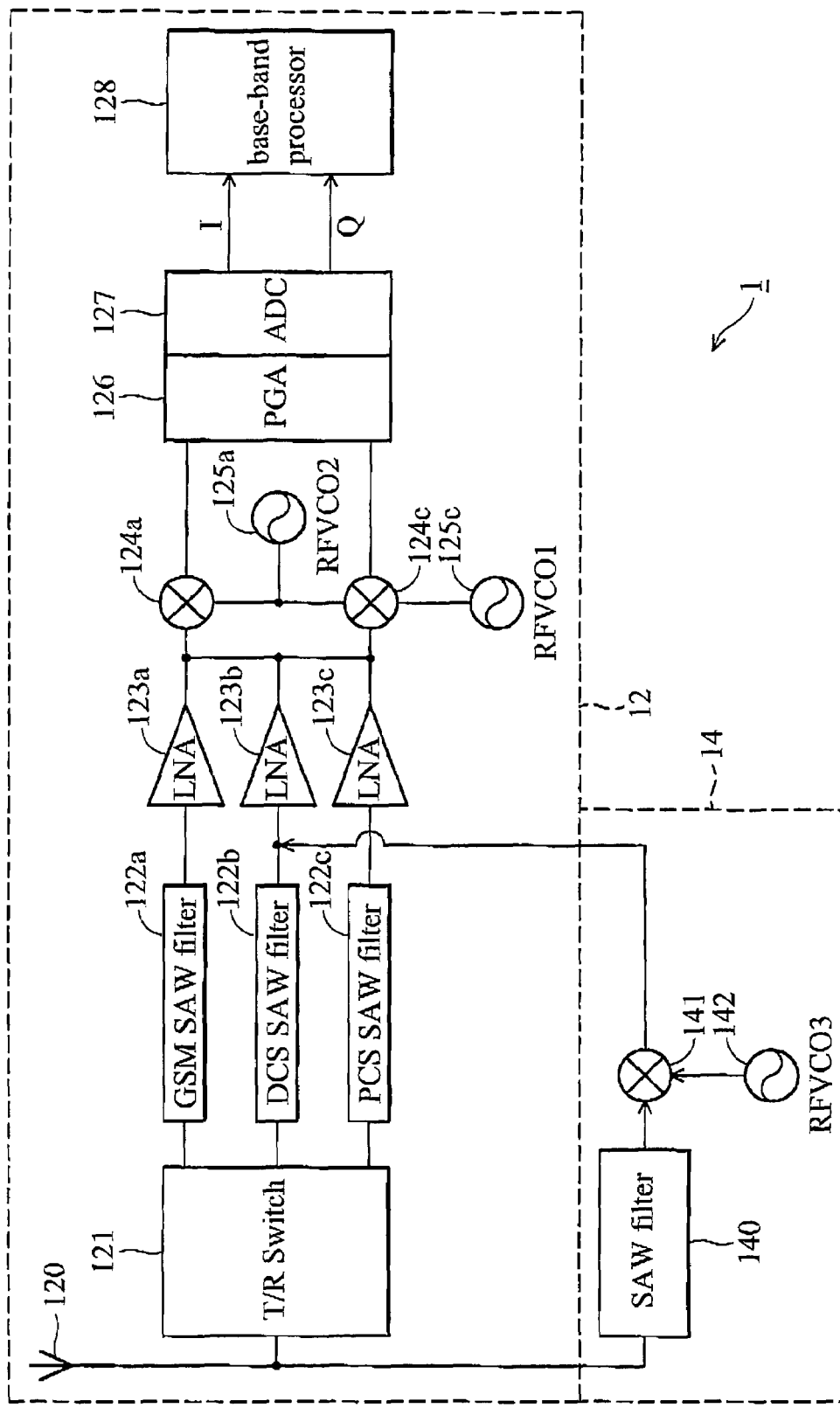
FIG. 1 is a schematic diagram illustrating the front end of a mobile phone with wireless camera detection according to a first embodiment of the invention.

FIG. 1 illustrates the front end of a mobile phone with wireless camera detection according to a first embodiment of the invention. The mobile phone of the first embodiment is a tri-band phone, receiving on wavelengths of 900 MHz, 1800 MHz. FIG. 1 illustrates the receiving end 1 of the mobile phone, comprising an original receiving end 12 and a new component 14 detecting wireless cameras. The antenna 120 receives radio signals and for passage to Surface Acoustic Wave (SAW) filters 122a~122c through a Transmitting/Receiving (T/R) switch 121. The three SAW filters 122a~122c individually correspond to one of the three frequency bands supported by the mobile phone. These three frequency bands are Global System for Mobile Communication (GSM) signal at 900 MHz, Digital Cellular Systems (DCS) signal at 1800 MHz, and Personal Communications Services (PCS) at 1900 MHz. If a signal corresponds to any of the valid frequency bands, signal strength is amplified by a corresponding Low Noise Amplifier (LNA) 123a~123c. The amplified signal output from the LNA 123a~123c is routed to the corresponding mixer 124a or 124b for modulation from high frequency to baseband frequency. The baseband signal is then provided to a Programming Gain Amplifier (PGA) 126 and an Analog to Digital Converter (ADC) 127. Subsequently, a baseband processor 128 performs remaining digital signal processing such as decoding when receiving the output of the ADC 127.

The mobile phone disclosed in the embodiment down converts the 2.4 GHz radio signal to the DCS frequency (1.8 GHz), and then analyzes the signal strength. When the antenna 120 of the mobile phone receives a 2.4 GHz~2.49 GHz signal, the signal is filtered by the SAW filter 140 and provided to the mixer 141. The mixer 141 modulates the 2.4 GHz signal to 1.8 GHz by mixing the filtered signal with the frequency generated by the third Radio Frequency Voltage Control Oscillator (RFVCO) 142. The modulated signal is provided to the LNA 123b corresponding to the DCS signal, and treated as a DCS signal. The mobile phone is also capable of receiving signals transmitted at the other two frequency bands, GSM and PCS, while periodically detecting the transmission bandwidth of the wireless camera. A switch can be added or controlling software modified to further prevent signal interference, wherein the mobile phone is only allowed to detect the wireless camera when switched to a detection mode. The transmitting end must be disabled, but the receiving end and baseband processor are still activated in detection mode.

The antenna 120 must be capable of receiving signals transmitted at 2.4~2.49 GHz for detection of wireless cameras. Thus, antenna characteristics are a concern in implementation, since the antenna 120 must also have relatively low signal degradation with respect to the 2.4~2.49 GHz signals. The pass bandwidth of the SAW filter 140 is 2.4~2.49 GHz, the transmission bandwidth of wireless cameras. The pass bandwidth of the SAW filter 140 matches the expected bandwidth of the wireless cameras, such as 1.2 GHz. The oscillation frequency of the RFVCO 142 must also match the phone design, which converts the frequency of signals from wireless cameras to the frequency supported in the mobile phone. For example, the RFVCO 142 in the present embodiment down converts the 2.4~2.49 GHz signal to a 1.805~1.88 GHz (DCS transmission bandwidth) signal. The bandwidth for transmitting radio signals generated by wireless cameras is 90 MHz, and the DCS receiving bandwidth is 75 MHz, thus the RFVCO must generate two frequencies, 0.595 GHz (2.4 GHz-1.805 GHz) and 0.61 GHz (2.49 GHz-1.88 GHz) accordingly. The oscillation frequency of the RFVCO 142 depends on the phone design, so if another frequency band is chosen.(i.e. GSM or PCS), the oscillation frequency is derived according to differences between the selected frequency band and the expected transmission bandwidth of the wireless camera. The mixer 141 converts the frequency of the radio signal sent by the wireless camera to the DCS frequency using the oscillation frequency generated by the RFVCO 142. The transmission bandwidth of the wireless camera can be covered by the DCS bandwidth if it is less than the DCS bandwidth, so the RFVCO 142 needs only generate an oscillation frequency corresponding to the difference between the medium frequencies in the bandwidth of wireless camera and DCS.

The radio signal generated by the wireless camera is treated as 1.8 GHz mobile phone signal after modulation, and sequentially provided to PGA 126, ADC 127, and baseband processor 128. When the RFVCO 142 oscillates at 595 MHz, the mobile phone examines the 2.4 G~2.475 GHz wireless camera signal, the baseband processor 128, while still processing signals with frequency band of 1.805~1.865 GHz. The software of the baseband processor controls the mobile phone to scan the signal strength of the 2.4~2.475 GHz signal periodically. The scanned signal does not require decoding, but the signal strength will be accumulated, or the number of times the signal strength exceeds a predetermined strength is counted, in order to determine the presence of a wireless camera. Several specific frequencies in the transmission bandwidth of the wireless camera are scanned with a frequency interval, with the frequency interval less than the video frequency bandwidth. The RFVCO 142 is set to oscillate at 610 MHz after scanning the signal at frequency 2.475 GHz~2.49 GHz, the baseband processor 128, however, processes the scanned signal after modulation, at frequencies from 1.865 GHz to 1.88 GHz.

A determination method is provided to prevent signal interference affecting the wireless camera detection result. The method measures the power of the signal at successive frequencies. If the bandwidth of transmission for the wireless camera is M, and the frequency interval for detection is identical to the channel bandwidth of the mobile communication, 200 KHz, the number of successive measurements is N, which denotes the number of 200 KHz channels within the detection bandwidth, and 200(N−1)<=M<=200N, the signal processor in the mobile phone can determine the presence of a wireless camera according to the sum of the power measured in N successive measurements. The mobile phone alerts the user by audio, display, or vibration when a wireless camera is detected. Determination can also be based on a counter counting occurrences of signal power exceeding a preset strength. For example, a wireless camera in operation is detected if more than 20 out of 30 power detection exceeds the preset strength. The method of wireless camera determination can be upgraded with the coding scheme at no additional cost.

Furthermore, if the RFVCO for mobile communication in the mobile phone is capable of modulating the radio signal of wireless camera to a receiving bandwidth of the mobile communication, it is not necessary to install another VCO for detection, thus further reducing the cost.

The frequency range of 2.4~2.49 GHz is within public spectrum, and thus susceptible to interference from signals such as microwave or Bluetooth. The mobile phone of the embodiment scans the signal at a frequency band wider than that of the wireless camera, and determines wireless camera presence if the signal strength is approximately constant within only the transmission bandwidth of the wireless camera. If a signal is strong in other frequency bands, it is differentiated from that of a wireless camera.

Second Embodiment

Figure 2:
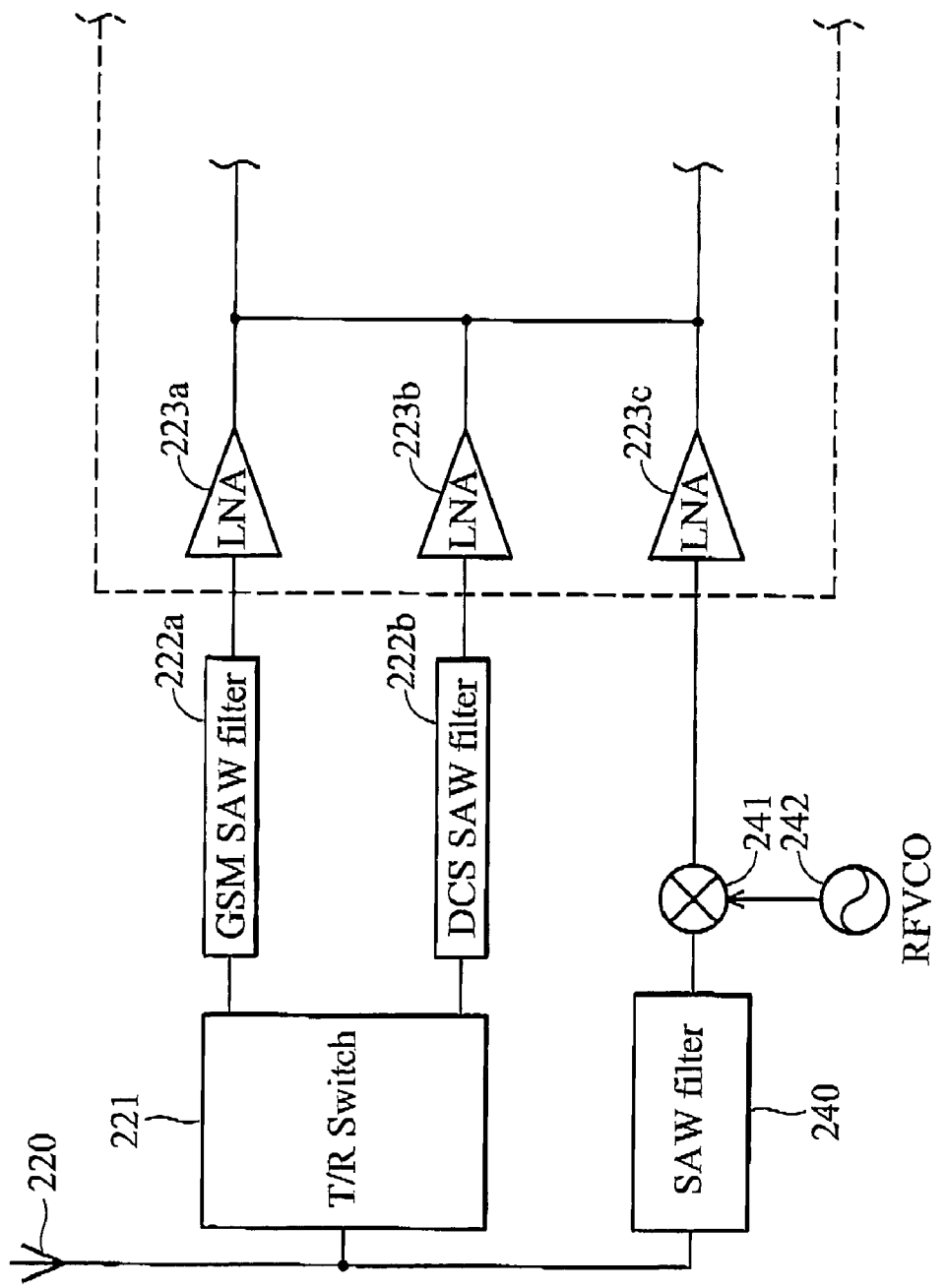
FIG. 2 is a schematic diagram illustrating the front end of a mobile phone with wireless camera detection according to a second embodiment of the invention.

A second embodiment of the mobile phone shown in FIG. 2 takes advantage of environments utilizing fewer than all three of the GSM, DCS, and PCS systems. When antenna 220 of the mobile phone receives a signal, a SAW filter 240 filters frequencies not within 2.4~2.495 GHz bandwidth. The filtered signal is then provided to a mixer 242 for modulation according to the frequency generated by a RFVCO 242. Consequently, the modulated signal is at the frequency of the PCS signal (1.9 GHz). Resources for processing PCS signals not used can thus be optimized to perform wireless camera detection. The output of the mixer 242 is hence provided to the LNA 223c. Remaining phone structures and signal processing methods of this embodiment are identical to the first embodiment, and are thus not repeated.

Components inside the dashed line are implemented in an Integrated Circuit (IC), and by excluding the components intended to process PCS signal, the impedance matching problem is ameliorated. The structure of the mobile phone in the embodiment is identical to the current tri-band mobile phone excepting an additional SAW filter 240, RFVCO 242, and mixer 241. Since the technology for manufacturing such tri-band mobile phones is very mature, the detection function can be easily and economically integrated. The circuit for detection of wireless cameras can thus be implemented on the receiving path for the PCS signal in environments not using PCS system, and can be implemented on the receiving path for either the GSM or DCS signal in environments not using either of these.

Third Embodiment

Figure 3:
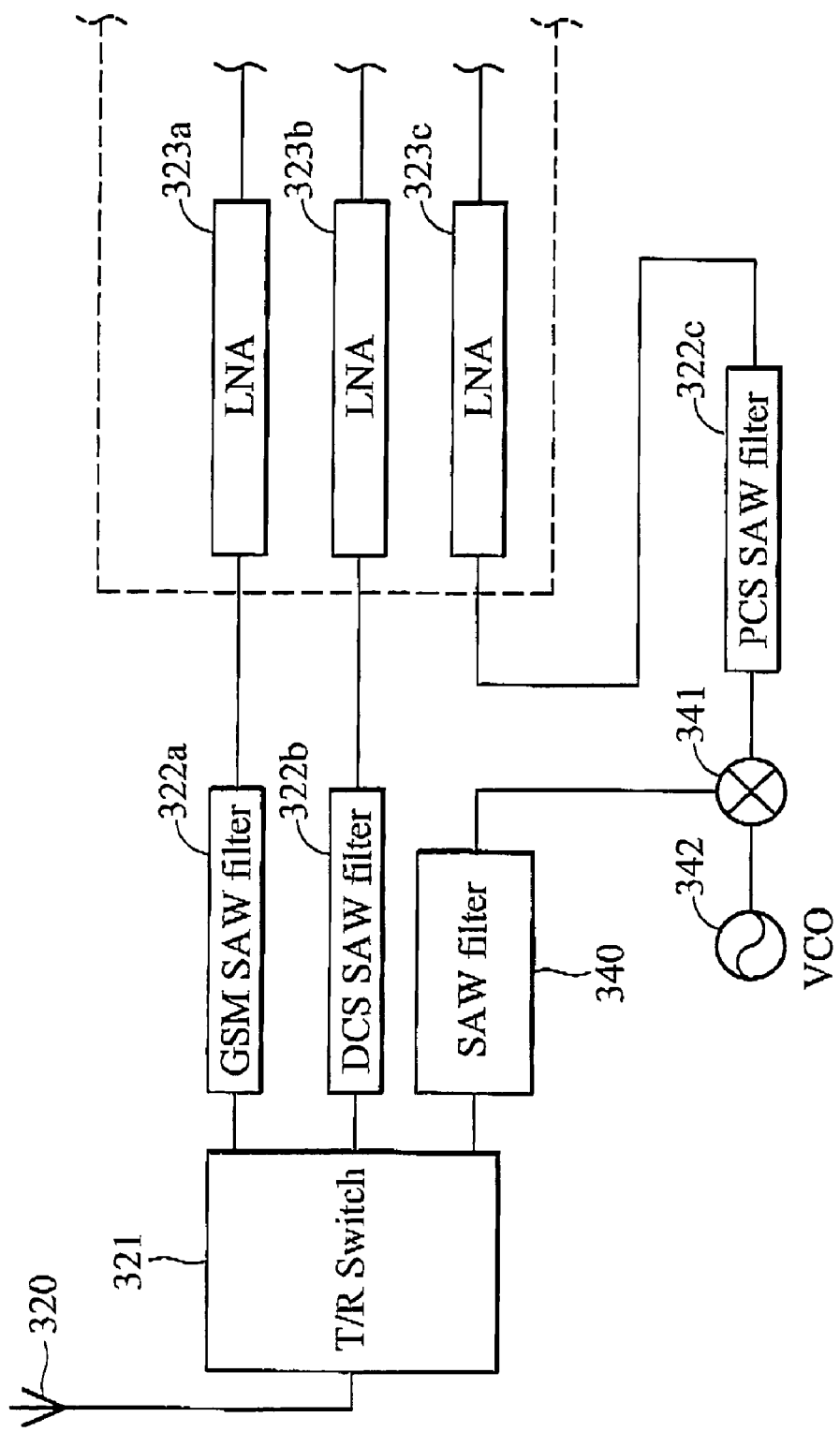
FIG. 3 is a schematic diagram illustrating the front end of a mobile phone with wireless camera detection according to a third embodiment of the invention.

FIG. 3 shows the front end of a mobile phone according to a third embodiment of the invention. Compared to the mobile phone of the second embodiment, the SAW filter 340 is coupled to the T/R switch 321, and the modulated signal output from the mixer 341 is provided to the SAW filter 322c originally for the PCS signal. The T/R switch 321 is thus used for the GSM and DCS signal, as well as the radio signal generated by wireless cameras. Furthermore, the signal can again be converted to the PCS frequency through the PCS SAW filter 322c to further filter interference at other frequencies.

Fourth Embodiment

Figure 4:
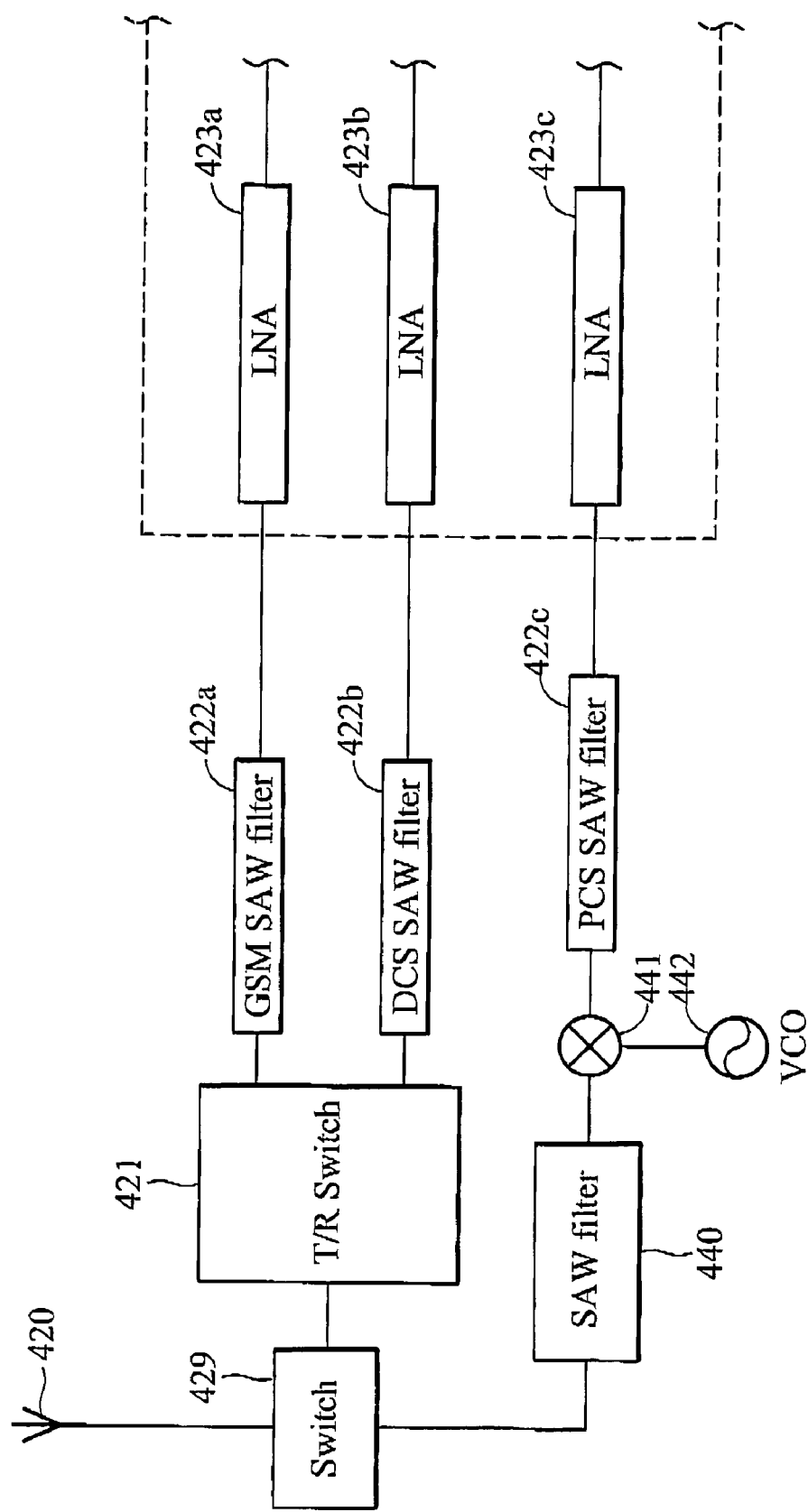
FIG. 4 is a schematic diagram illustrating the front end of a mobile phone with wireless camera detection according to a fourth embodiment of the invention.

FIG. 4 shows the front end of a mobile phone according to a fourth embodiment of the invention. In the fourth embodiment, a switch 429 is coupled to the antenna 420. The switch 429 connects to either the T/R switch 421 or the SAW filter 440 depending on the current operating mode of the mobile phone. If the mobile phone is in detection mode, the signal received by the antenna 420 is provided to the SAW filter 440 and processed to determine whether it is from a wireless camera. If the mobile phone is in the communication mode, the switch 429 establishes connection to the T/R switch 421 to receive and transmit signals for mobile communication.

Fifth Embodiment

Figure 5:
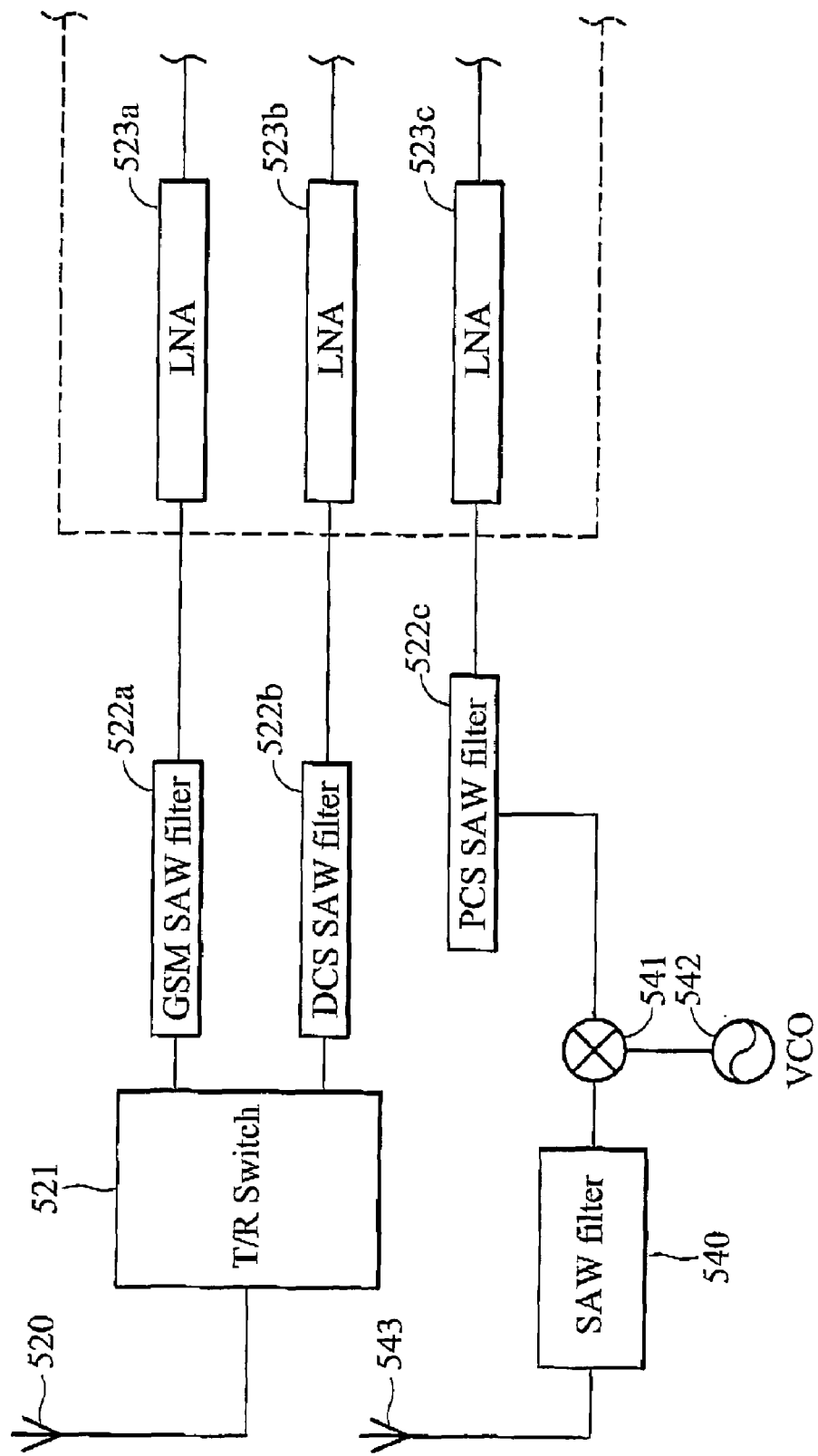
FIG. 5 is a schematic diagram illustrating the front end of a mobile phone with wireless camera detection according to a fifth embodiment of the invention.

FIG. 5 shows the front end of a mobile phone according to a fifth embodiment of the invention. In the fifth embodiment, a dedicated antenna 543 is added to receive the radio signal generated by the wireless camera, which replaces the extra switch described in FIG. 4.

The mobile phone with wireless camera detection in embodiments of the invention provide detection of wireless cameras, at low implementing costs full use is made of existing components in the mobile phone. The mobile phone with wireless camera detection provides highly sensitive detection since the mobile phone can detect signal strength as low as −100 dBm, and the transmitting power of a wireless camera is around 10 mW, which is 10 dBm.

Finally, while the invention has been described by way of example and in terms of the above, it is to be understood that the invention is not limited to the disclosed embodiments. On the contrary, it is intended to cover various modifications as would be apparent to those skilled in the art.

What is claimed is:

1. A mobile phone with wireless camera detection operating in detection or communication mode, comprising:
    an antenna;
    a first mobile phone filter, receiving signals from the antenna and outputting a first signal corresponding to a first bandwidth;
    a third filter, receiving signals from the antenna and outputting a detection signal corresponding to a detection bandwidth, corresponding to that used by a wireless camera;
    an oscillator, generating a corresponding frequency which is the difference between the middle values of a wireless camera's transmission bandwidth and a second bandwidth;
    a mixer, generating a second signal by mixing the detection signal and the corresponding frequency, wherein the second signal corresponds to the second bandwidth; and
    a signal processor, processing the first signal and the second signal selectively,
    enabling mobile communication using the first signal when in communication mode, and detecting the signal strength of the second signal when in detection mode.

2. The mobile phone according to claim 1, wherein the third filter is a Surface Acoustic Wave (SAW) filter, and the bandwidth of the third filter corresponds to the transmission bandwidth of the wireless camera.

3. The mobile phone according to claim 1, wherein the oscillator is a Radio Frequency Voltage Control Oscillator (RFVCO).

4. The mobile phone according to claim 1, wherein the corresponding frequency is either a first or a second frequency when the detection bandwidth exceeds the second bandwidth, wherein the first and the second frequencies are relative differences of the maximum and minimum values between the detection bandwidth and the second bandwidth.

5. The mobile phone according to claim 4, wherein the detection bandwidth is 2.4~2.49 GHz, the second bandwidth is 1.805~1.88 GHz, and the first and the second frequencies are 0.595 GHz and 0.61 GHz respectively.

6. The mobile phone according to claim 1, further comprising a second mobile phone filter, receiving the signal from the antenna and outputting a third signal corresponding to a third bandwidth, and the signal processor selectively processes the first or the third signal when the mobile phone is in communication mode.

7. The mobile phone according to claim 1, further comprising a switch, switching input from the signal processor according to operating mode, sending the second signal to the signal processor when in detection mode, and enabling the mobile phone to communicate using the first signal when in communication mode.

8. The mobile phone according to claim 1, wherein the signal processor further comprises:
    a first low noise amplifier, amplifying the first signal;
    a second low noise amplifier, amplifying the second signal;
    a modulator, selectively converting the output of the first or the second low noise amplifier to generate a baseband signal;
    an Analog to Digital Converter (ADC), converting the baseband signal to a digital signal; and
    a baseband processor, receiving the digital signal, and determine the presence of the wireless camera according to the strength of the digital signal when the mobile phone is in detection mode.

9. The mobile phone according to claim 1, wherein the signal processor scans specific frequencies of the second bandwidth defined by a predetermined frequency band when in detection mode.

10. The mobile phone according to claim 9, wherein the predetermined frequency band corresponds to the bandwidth of the first signal.

11. The mobile phone according to claim 9, wherein the signal processor accumulates the strength of the scanned signal at specific frequencies, and detects presence of the wireless camera when the accumulated signals exceed a preset strength.

12. The mobile phone according to claim 9, wherein the specific frequencies of the second bandwidth are continuously scanned to measure signal.

13. The mobile phone according to claim 9, wherein the signal processor sets a counter and detects presence of the wireless camera if the count exceeds a predetermined value, the count increasing when the strength of the scanned signal at a specific frequency exceeds a preset value.

* * * * *